US012572450B1

(12) United States Patent
Sathyamurthy

(10) Patent No.: US 12,572,450 B1
(45) Date of Patent: Mar. 10, 2026

(54) SUPERVISED DATA ACCESS FOR TEST FAILURE REMEDIATION

(71) Applicant: State Farm Mutual Automobile Insurance Company, Bloomington, IL (US)

(72) Inventor: Deepak Sathyamurthy, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 227 days.

(21) Appl. No.: 18/427,286

(22) Filed: Jan. 30, 2024

(51) Int. Cl.
*G06F 11/3668* (2025.01)
*G06F 11/3698* (2025.01)

(52) U.S. Cl.
CPC ...... *G06F 11/3688* (2013.01); *G06F 11/3684* (2013.01); *G06F 11/3698* (2025.01)

(58) Field of Classification Search
CPC ............. G06F 11/3684; G06F 11/3688; G06F 11/3698
See application file for complete search history.

(56) References Cited

U.S. PATENT DOCUMENTS

| | | | | |
|---|---|---|---|---|
| 8,291,387 | B2 * | 10/2012 | Pal ...................... | G06F 11/3457 |
| | | | | 703/22 |
| 9,442,830 | B1 * | 9/2016 | Zhang ................. | G06F 11/3698 |
| 10,073,763 | B1 * | 9/2018 | Raman ................... | G06N 20/00 |
| 2012/0023484 | A1 | 1/2012 | Demant | |
| 2012/0023485 | A1 | 1/2012 | Dubey et al. | |
| 2015/0113331 | A1 * | 4/2015 | Bhattacharya ...... | G06F 11/3688 |
| | | | | 714/38.1 |
| 2017/0315905 | A1 | 11/2017 | Choudhury | |
| 2019/0179731 | A1 * | 6/2019 | V ........................ | G06F 11/3684 |

* cited by examiner

*Primary Examiner* — Ziaul A Chowdhury
(74) *Attorney, Agent, or Firm* — Lee & Hayes, P.C.

(57) ABSTRACT

Techniques for supervised access to the error logs stored on a protected database to perform test failure remediation with respect to the failures associated with prior executions of test scripts. In some cases, when the execution of a test script is aborted because a data value provided by the test script fails to match a corresponding data record stored on a target database, a corresponding error log may be created. To remediate the noted test failure, an example system may select a test correction template that is associated with a corresponding test correction script and provide a corrected data value as a parameter of the selected template. Subsequently, the system may perform operations associated with a database transaction that is configured to: (i) re-execute the operations associated with the previously aborted test script, and (ii) upon successful re-execution, remove the corresponding error log.

20 Claims, 6 Drawing Sheets

200

300

QUERY THE ERROR QUEUE
302

MATCHING ERROR LOG?
304

No

DO NOT PROCESS THE ERROR LOG
306

YES

PROCESS THE ERROR LOG IN ACCORDANCE WITH THE SCRIPT
308

SCRIPT EXECUTION SUCCESSFUL?
310

No

DO NOT REMOVE LOG
312

YES

REMOVE LOG
314

500

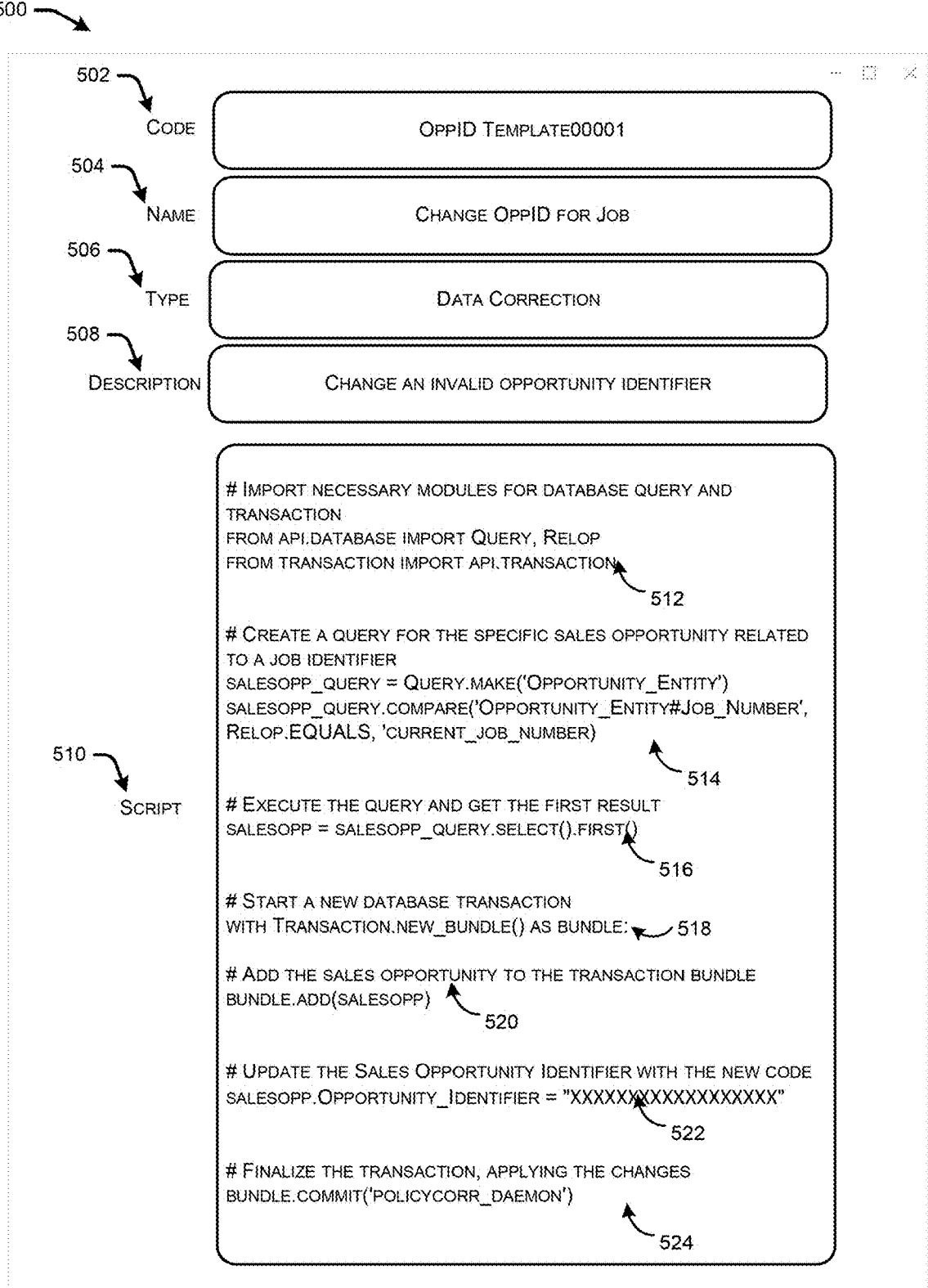

502

CODE — OPPID TEMPLATE00001

504

NAME — CHANGE OPPID FOR JOB

506

TYPE — DATA CORRECTION

508

DESCRIPTION — CHANGE AN INVALID OPPORTUNITY IDENTIFIER

510

SCRIPT

```
# IMPORT NECESSARY MODULES FOR DATABASE QUERY AND
TRANSACTION
FROM API.DATABASE IMPORT QUERY, RELOP
FROM TRANSACTION IMPORT API.TRANSACTION
                                        512

# CREATE A QUERY FOR THE SPECIFIC SALES OPPORTUNITY RELATED
TO A JOB IDENTIFIER
SALESOPP_QUERY = QUERY.MAKE('OPPORTUNITY_ENTITY')
SALESOPP_QUERY.COMPARE('OPPORTUNITY_ENTITY#JOB_NUMBER',
RELOP.EQUALS, 'CURRENT_JOB_NUMBER)
                                        514

# EXECUTE THE QUERY AND GET THE FIRST RESULT
SALESOPP = SALESOPP_QUERY.SELECT().FIRST()
                                        516

# START A NEW DATABASE TRANSACTION
WITH TRANSACTION.NEW_BUNDLE() AS BUNDLE:    518

# ADD THE SALES OPPORTUNITY TO THE TRANSACTION BUNDLE
BUNDLE.ADD(SALESOPP)
                        520

# UPDATE THE SALES OPPORTUNITY IDENTIFIER WITH THE NEW CODE
SALESOPP.OPPORTUNITY_IDENTIFIER = "XXXXXXXXXXXXXXXXXXX"
                                        522

# FINALIZE THE TRANSACTION, APPLYING THE CHANGES
BUNDLE.COMMIT('POLICYCORR_DAEMON')
                                        524
```

FIG. 5

SUPERVISED DATA ACCESS FOR TEST FAILURE REMEDIATION

TECHNICAL FIELD

The present disclosure relates to software testing systems, and more particularly to techniques for test data correction using test correction templates.

BACKGROUND

Sophisticated testing frameworks for complex software systems have been developed to provide abilities to efficiently validate functionality, measure quality, and diagnose failures. Test execution typically includes interacting with a system under test by following test plans and test cases defined using the framework. However, even with well-designed tests, software flaws, data errors, and misconfigured components can still cause test failure incidents. Remediating these test failures plays an important role in maintaining adequate test coverage and advancing incremental software releases.

Existing solutions for test failure remediation require complex manual and ad hoc procedures. However, such approaches are tedious, time consuming, costly, and unreliable across complex systems with long feedback loops. These shortcomings are exasperated when the test cases are being performed in relation to test cases that contain highly sensitive and/or highly valuable data.

Examples of the techniques described in the present disclosure are directed to overcoming the deficiencies noted above.

SUMMARY

In some examples, the techniques described herein relate to a computer-implemented method, including receiving, by a processor, a first request to execute a test script, wherein the first request comprises a first data value corresponding to a first data field. The method further comprises based on receiving the first request, executing, by the processor, the test script, wherein executing the test script comprises providing a second request to a database system to perform data retrieval based on the first data value. The method further comprises receiving, by the processor and based on the second request, a first indication of a first error log stored on the database system, wherein the first error log represents that execution of test script was aborted based on a failure to match the first data field with data stored on the database system. The method further comprises receiving, by the processor and based on the first indication, a first test correction template configured to request execution of a first test correction script. The method further comprises receiving, by the processor and based on the first indication, a second test correction template configured to request execution of a second test correction script, wherein the first test correction template requires user entry of at least a second data value corresponding to the first data field, and the second test correction template requires user entry of at least a third data value corresponding to a second data field. The method further comprises providing, by the processor, the first test correction template and the second test correction template via a display. The method further comprises receiving, by the processor and via the display, input data comprising a second indication of a selection of the first test correction template and a third indication of entry of the second data value. The method further comprises, based on receiving the input data, executing, by the processor, the first test correction script.

In additional examples, the techniques described herein relate to a computing system, including a processor and memory storing computer-executable instructions that, when executed by the processor, cause the computing system to perform operations including receiving a first request to execute a test script, wherein the first request comprises a first data value corresponding to a first data field. The operations further comprise based on receiving the first request, executing the test script, wherein executing the test script comprises providing a second request to a database system to perform data retrieval based on the first data value. The operations further comprise receiving, and based on the second request, a first indication of a first error log stored on the database system, wherein the first error log represents that execution of test script was aborted based on a failure to match the first data field with data stored on the database system. The operations further comprise receiving, and based on the first indication, a first test correction template configured to request execution of a first test correction script. The operations further comprise receiving, and based on the first indication, a second test correction template configured to request execution of a second test correction script, wherein the first test correction template requires user entry of at least a second data value corresponding to the first data field, and the second test correction template requires user entry of at least a third data value corresponding to a second data field. The operations further comprise providing the first test correction template and the second test correction template via a display. The operations further comprise receiving, and via the display, input data comprising a second indication of a selection of the first test correction template and a third indication of entry of the second data value. The operations further comprise, based on receiving the input data, executing the first test correction script.

In further examples, the techniques described herein relate to one or more non-transitory computer-readable media storing computer-executable instructions that, when executed by the processor, cause the one or more processors to perform operations, including receiving a first request to execute a test script, wherein the first request comprises a first data value corresponding to a first data field. The operations further comprise based on receiving the first request, executing the test script, wherein executing the test script comprises providing a second request to a database system to perform data retrieval based on the first data value. The operations further comprise receiving, and based on the second request, a first indication of a first error log stored on the database system, wherein the first error log represents that execution of test script was aborted based on a failure to match the first data field with data stored on the database system. The operations further comprise receiving, and based on the first indication, a first test correction template configured to request execution of a first test correction script. The operations further comprise receiving, and based on the first indication, a second test correction template configured to request execution of a second test correction script, wherein the first test correction template requires user entry of at least a second data value corresponding to the first data field, and the second test correction template requires user entry of at least a third data value corresponding to a second data field. The operations further comprise providing the first test correction template and the second test correction template via a display. The operations further comprise receiving, and via the display, input data comprising a second indication of a selection of the first test correction template and a third indication of entry of the second data value. The operations further comprise, based on receiving the input data, executing the first test correction script.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 provides an operational example of a user interface that displays creating and/or modifying configuration data associated with a test correction template.

DETAILED DESCRIPTION

This disclosure describes techniques for supervised access to the error logs stored on a protected database to perform test failure remediation with respect to the failures associated with prior executions of test scripts. In some cases, when the execution of a test script is aborted because a data value provided by the test script fails to match a corresponding data record stored on a target database, a corresponding error log may be created. To remediate the noted test failure, an example system may select a test correction template that is associated with a corresponding test correction script and provide a corrected data value as a parameter of the selected template. Subsequent to the selection of a template by the system, and input of the template parameter, the system may perform operations associated with a database transaction that is configured to: (i) re-execute the operations associated with the previously aborted test script, and (ii) upon successful re-execution, remove the corresponding error log. Accordingly, the test correction template may enable the system to access the protected database in a supervised database access mode to correct error logs associated with past test script execution failures.

Figure 1:
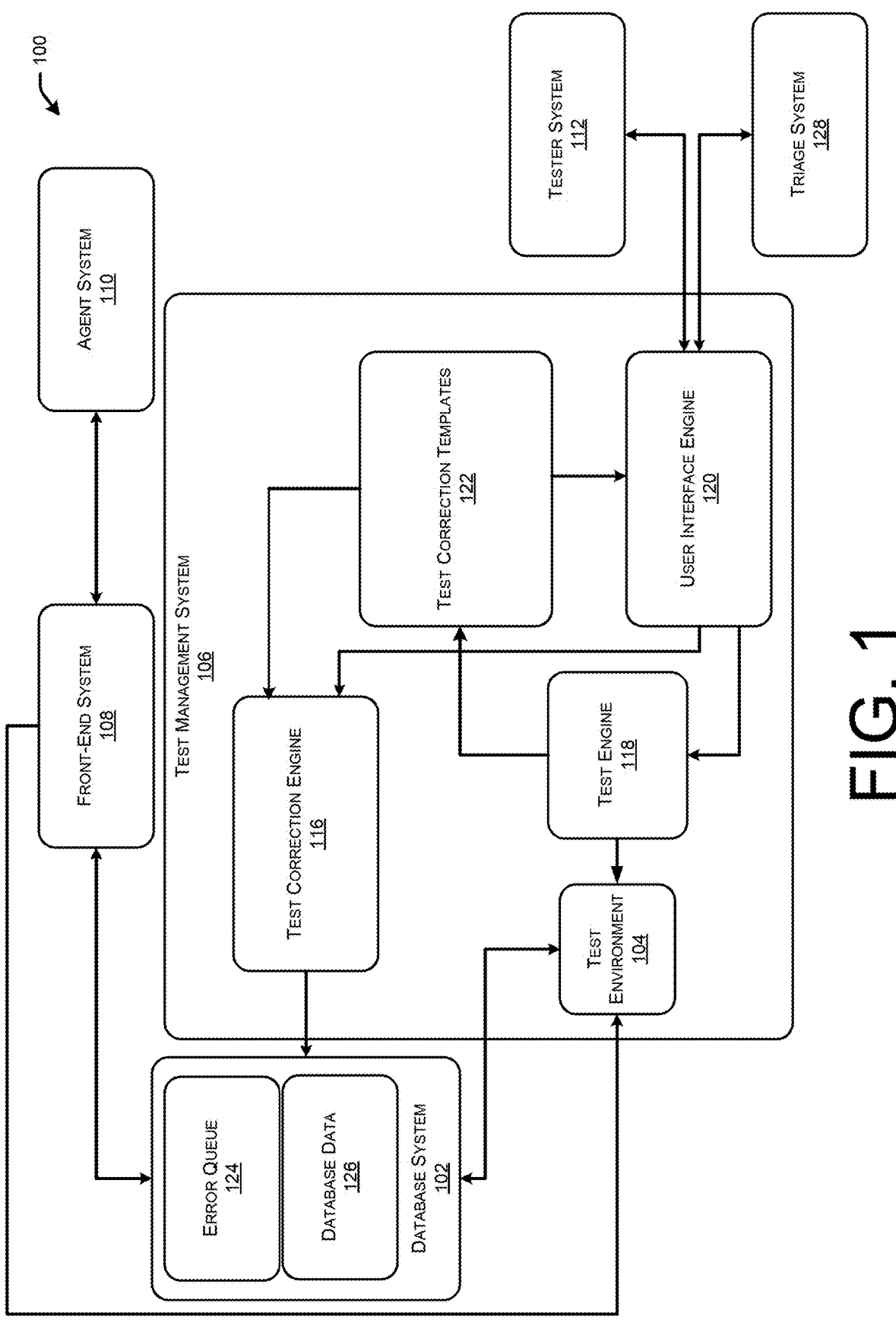
FIG. 1 depicts an example environment for performing operations to correct test data stored on a protected database using a set of test correction templates.

FIG. 1 depicts an example environment 100 for performing operations to correct test data stored on a protected database using a set of test correction templates 122. The environment 100 depicted in FIG. 1 may enable a triage system 128 to cause execution of a test correction script that enables modifying an error log stored on an error queue 124 of the database system 102. This capability may enable direct modification of the database system 102 in a manner not enabled during test script execution and/or front-end access by the front-end system 108.

As depicted in FIG. 1, the database system 102 is a protected database. In some examples, such a protected database may be configured such that access to the database system 102 is safeguarded by a set of access safeguards. For example, the agent system 110 may only be allowed to access the database system 102 via the front-end system 108. The front-end system 108 may be configured to limit the range of database access (e.g., data retrieval and/or modification) actions triggered by (e.g., performed in response to requests received from) the agent system 110 to a set of authorized actions. For example, the front-end system 108 may enable the agent system 110 to create a new data record (e.g., a new insurance policy record) and/or modify a particular field of the new data record. In some cases, because the front-end system 108 limits database access by the agent system 110 to a set of authorized actions (e.g., a set of authorized actions associated with capabilities enabled by a user interface platform that the front-end system 108 displays to a respective agent user associated with the agent system 110), the front-end system 108 enables supervised access to the database system 102, as opposed to direct and unsupervised access to the database system 102.

As another example of an access safeguard associated with the database system 102, a tester system 112 (e.g., a system executing a manual and/or an automated test script) may only be allowed to access the database system 102 via the test environment 104. The test environment 104 may also be configured to limit the range of database access actions triggered by the tester system 112 to a set of authorized actions. The set of authorized database access actions permitted by the test environment 104 may be the same as and/or different from the set of authorized database access actions permitted by the front-end system 108. For example, in some cases, the set of authorized database access actions permitted by the test environment 104 may include data retrieval actions but may exclude any data modification actions. As another example, in some cases, the set of authorized database access actions permitted by the test environment 104 may include data retrieval actions and any data modification actions permitted by the set of authorized database access actions permitted by the front-end system 108. Because the test environment 104 limits database access by the tester system 112 to a set of authorized actions, the test environment 104 enables supervised access to the database system 102, as opposed to direct and unsupervised access to the database system 102.

The test environment 104 may be allowed to enable a tester (e.g., a manual tester and/or an automated testing routine) to interact with the database system 102 as part of executing one or more test scripts. The test scripts may, for example, include retrieving data from the database system 102 as part of testing user interface features associated with the user interface platform of the agent system 110.

Accordingly, as depicted in FIG. 1, the environment 100 enables supervised access to the database system 102 for test script execution and/or for front-end access purposes. In some cases, given such a safeguarded database access environment, it is a challenge to enable other safeguarded modes of database access while ensuring the security of the database system 102. For example, in some cases, adding a new access mode associated with a new endpoint system (e.g., an access mode associated with correction of data stored on the database system 102 based on requests received from a triage system 128) requires adding new intermediary systems and/or environments to facilitate supervised access to the database system 102. This may be because, absent such intermediary solutions, an endpoint system (e.g., a triage system 128) may gain direct and/or unsupervised access to the database system 102, which may comprise the security objectives associated with the database system 102.

Therefore, in some implementations, each database access mode is supported by a corresponding intermediary solution designed to ensure supervised database access (e.g., database access limited to a set of authorized database access actions). This naïve approach may suffer from computational efficiency, network efficiency, and scalability drawbacks. For example, in some cases, supporting each database access mode with an intermediary safeguarding solution may require computational infrastructure required for executing operations of the intermediary solutions and/or may require networking infrastructure required for communication between the endpoint systems and the intermediary solutions. This may render the naïve approach inefficient from a computational and network resource usage standpoint. As another example, in some cases, supporting each database access mode with an intermediary safeguarding solution may lead to an architecture that suffers from scalability drawbacks because such an architecture would require providing substantial infrastructure associated with new and/or expanded intermediary solutions each time a new database access mode is added. Accordingly, the naïve approach of supporting each database access mode with an intermediary safeguarding solution suffers from drawbacks related to computational efficiency, network efficiency, and/or scalability.

To address the technical challenges associated with the naïve approach for enabling safeguarded database access to a database system 102 accessible by multiple database access modes, the environment 100 shown in FIG. 1 enables using a template-based approach to direct access to the database system 102. The template-based approach may be used to enable users to select database access templates and execute database access scripts by providing data corresponding to parameters of those templates. For example, the test management system 106 may enable a triage system 128 to select a test correction template and request execution of operations for modifying the test data stored on the database system 102 based on a test correction script associated with the corresponding to the selected template. In this example, the database access mode configured to enable a triage system 128 to modify the test data stored on the database system 102 can be enabled in a safeguarded fashion by using the template-based data access techniques described herein.

While the template-based safeguarded database access techniques are described herein with respect to a database access mode configured to enable a triage system 128 to modify test data stored on the database system 102 (e.g., to correct the data associated with a previously-executed but aborted test script), a person of ordinary skill in the relevant technology will recognize that other modes of database access may be enabled using the template-based techniques described herein.

For example, in an environment 100 that enables a first access mode (e.g., an access mode associated with database access actions triggered by an agent system 110) using an intermediary system (e.g., the front-end system 108) and a second access mode (e.g., an access mode associated with database access actions triggered by a tester system 112) using an intermediary environment (e.g., the test environment 104), a first set of database access templates may be configured to modify access authorizations associated with the database system 102, a second set of database access templates may be configured to modify configuration data (e.g., the number of nodes utilized) stored by the database system 102, and a third set of database access templates may be configured to modify error logs associated with aborted test script executions performed in relation to the database system 102.

In some cases, a database access template may be a data object that represents data associated with a database access script. The database access template may be associated with one or more parameters, where each parameter may be a variable defined by the corresponding database access script. The parameter associated with a database access template may be a variable, a database query, a database schema element, and/or a set of executable database commands. The parameter value corresponding to a parameter may be provided by a user and/or by an automated software application (e.g., a user of the triage system 128 and/or an automated software application executed by the triage system 128). In some cases, before the database access script associated with a database access template is executed, the parameter values may be parsed and/or used to replace parameters of the template. An example of a database access template is a test correction template, as further described below.

For example, if a database access template is configured to modify access authorizations associated with the database system 102, the parameters of such a template may define access authorization fields (e.g., password fields, personal identification number fields, and/or the like) as well as values for those access authorization fields. As another example, if a database access template is configured to modify configuration data (e.g., the number of nodes utilized) by the database system 102, the parameters of such a template may define configuration setting fields (e.g., the number of database nodes, an operational load balancing profile, and/or the like) as well as values for those access authorization fields. As another example, if a database access template is configured to modify error logs associated with aborted test script executions performed in relation to the database system 102, the parameters of such a template may define a set of error logs having erroneous data values (e.g., a set of error log identifier values, such as a set of job identifier values associated with the test script executions corresponding to those error logs) and/or correct data values corresponding to those erroneous data values.

In some cases, a database access script is an executable, parameterized set of database interaction instructions that are applied to the database system 102 within constraints set by both the script logic and overarching access controls on the database system 102. A database access script may be configured to: (i) detect a set of database records (e.g., a set of records stored on the database system 102, such as a set of error logs stored on the error queue 124) that match one or more criteria (e.g., a set of error logs whose respective error log identifiers match a set of predefined error log identifiers), and (ii) request execution of a database transaction in relation to the detected records. A database transaction may be a set of database access operations that are performed atomically, such that all of the set of database access operations associated with the transaction are either successfully executed (e.g., successfully modify the data stored on the database system 102) or are not executed at all. In some cases, because a database access script includes a database transaction request, the atomicity of the resulting data transaction makes the database access script a suitable solution for executing a batch of database access operations (e.g., a batch of test data correction operations). The database transaction may be performed using a daemon (e.g., a background) process. An example of a database access script is a test correction script, as further described below.

For example, a database access script may be configured to: (i) detect a set of access authorization fields (e.g., password fields, personal identification number fields, and/or the like) associated with the database system 102 (e.g., as indicated by the corresponding database access template), and (ii) modify the set of access authorization fields based on values for those access authorization fields (e.g., as indicated by the corresponding database access template). As another example, a database access script may be configured to: (i) detect a set of configuration setting fields (e.g., the number of database nodes, an operational load balancing profile, and/or the like) associated with the database system 102 (e.g., as indicated by the corresponding database access template), and (ii) modify the set of configuration setting fields based on values for those configuration setting fields (e.g., as indicated by the corresponding database access template). As another example, a database access script may be configured to: (i) detect a set of error logs stored on the database system 102 that have erroneous data values (e.g., as indicated by the corresponding database access template), and (ii) modify the error logs based on corrected values for erroneous data fields associated with the error logs (e.g., as indicated by the corresponding database access template).

FIG. 1 will now be further described with respect to example operations performed by the test management system 106 to modify an error log stored on the error queue 124 of the database system 102 based on the test correction templates 122 stored by the test management system 106. As depicted in FIG. 1, the test management system 106 includes a user interface engine 120, a set of test correction templates 122, a test correction engine 116, a test engine 118, and a test environment 104.

The user interface engine 120 may be configured to enable a tester system 112 to request execution of a test script. Based on (e.g., in response to) receiving such a test script execution request, the user interface engine 120 may provide the request to the test engine 118 that executes the test script by generating the test environment 104. The test script may be configured to, using the generated test environment 140: (i) retrieve a data record from the database data 126 stored by the database system 102, and (ii) perform a functionality associated with the front-end system 108 based on the retrieved data record. The functionality may be a functionality that is currently deployed on the front-end system 108 and/or a functionality that is being tested for potential deployment on the front-end system 108 (e.g., a modification of a functionality that is currently deployed on the front-end system 108 and is being tested for potential deployment on the front-end system 108). The test script may be executed by the test engine 118 and using the test environment 104.

For example, the test script may be coded by a test engineer and/or configured to determine the behavior of the front-end system 108 if a particular portion of a user interface associated with a user interface platform of the front-end system is removed. In this example, the test script may be configured to, when executed in the test environment 104, generate, display, and/or record data associated with the display of the modified user interface within the test environment 104. Displaying the modified user interface within the test environment 104 may include making a query to the database system 102 to retrieve data that may be configured to be displayed by the modified user interface. Such a query may include querying one or more data values associated with a retrieval key (e.g., an identifier key, such as a global identifier key that is shared between the front-end system 108 and/or the database system 102 and/or is used by the front-end system 108 to query the database system 102). The retrieval key may be specified by a parameter value associated with the test script execution request.

In an example implementation, the test script may be configured to test the behavior of the front-end system 108 when displaying a modified version of a user interface that is configured to display data associated with a sales opportunity (e.g., an insurance policy sales opportunity). The sales opportunity may be associated with a particular "opportunity identifier" value. Triggering execution of such a test script may require providing an indication of the particular opportunity identifier value as part of the request for execution of the test script. In some cases, the test environment 104 may enable the tester system 112 to: (i) provide the particular opportunity identifier value and an indication of the desired test script (e.g., the test script configured to test behavior of the front-end system 108 when displaying a particular modified interface), and (ii) gain access (e.g., via a uniform resource locator provided by the test environment 104) to the modified user interface generated by the desired test script. The modified user interface may include the data returned by querying the database system 102 in accordance with the provided opportunity identifier value. This may enable the tester system 112 to monitor and/or record the behavior of the front-end system 108 when loading the modified user interface.

Accordingly, as the test environment 104 may enable the tester system 112 (e.g., a user of the tester system 112 and/or a software application corresponding to an automated testing routine that is executed by the tester system 112) to: (i) provide a set of key values and an indication of a test script (e.g., as auto-generated by the system and/or input by the test designer), and (ii) cause execution of the test script by accessing a user interface that displays the output of the front-end system 108 after executing the test script based on data retrieved from the database system 102 using the set of key values. In some cases, execution of the test script may be aborted because of one or more errors. For example, execution of the test script may be aborted because at least one of the key values is erroneous (e.g., does not match with any keys for the data records stored as part of the database data 126). In some cases, if an execution of a test script is aborted, one or more error logs are generated and stored on the error queue 124.

Figure 4:
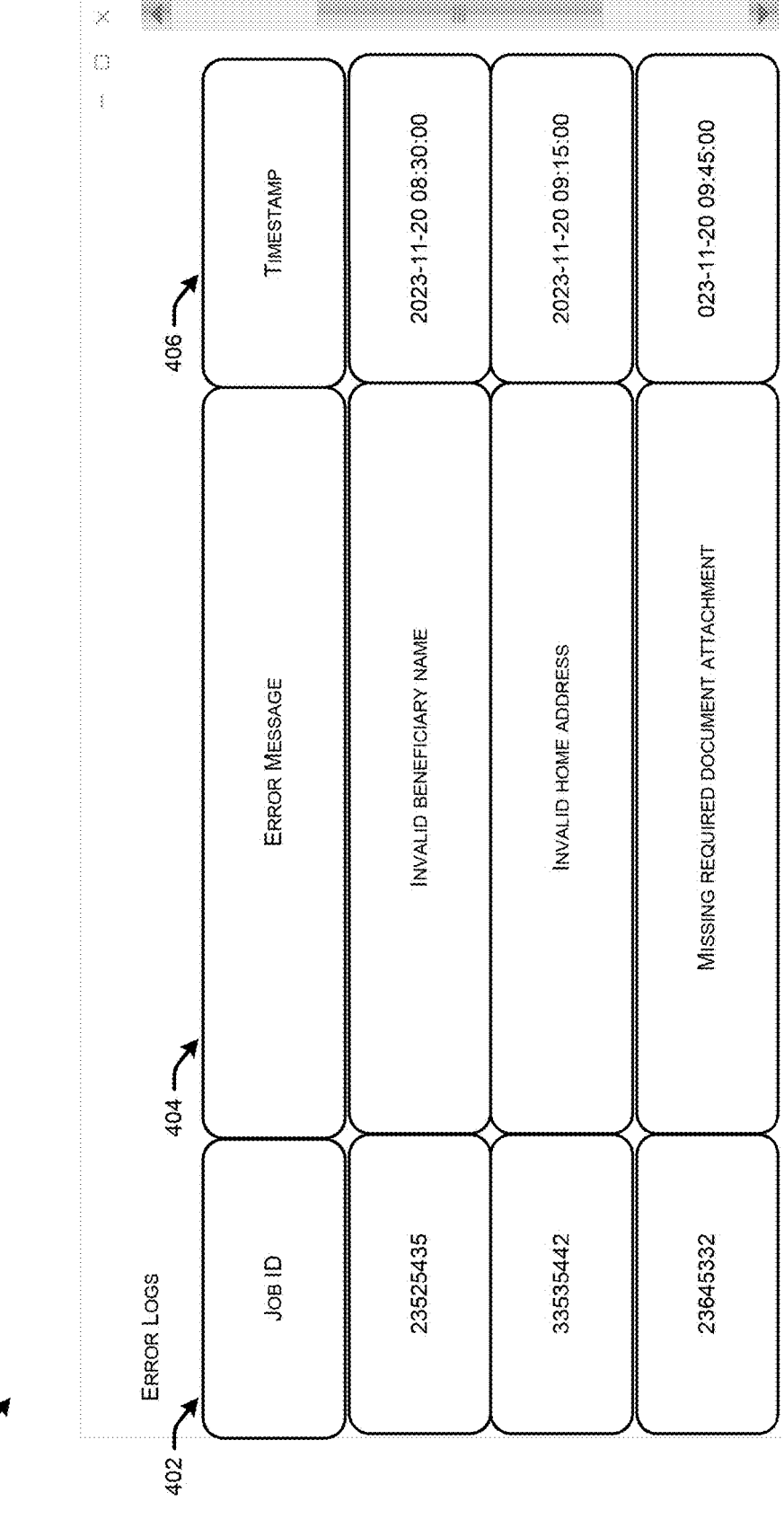
FIG. 4 provides an operational example of a user interface that displays a set of error logs associated with a set of previously aborted test script executions.

An error log may represent that an attempt to access the database system 102 by a test script has failed. For example, an error log may represent that, when retrieving data associated with a particular retrieval key, the retrieval key failed to match any of the retrieval keys associated with the database data 126 stored on the database system 102. In some cases, when a test script is performed with respect to a batch of N retrieval keys, N separate error logs are generated and stored on the error queue. Accordingly, in some cases, when there is an error in the parameter values of a test script that is configured to perform a batch database retrieval, a large number of error logs may be generated. Such a large number of error logs may, if not addressed via test correction operations, overwhelm the capacity of the error queue 124, overwhelm the capacity of the database system 102, and/or otherwise undermine effectiveness of future test script executions. In some cases, at least a subset of the error logs associated with the error queue 124 are displayed by the user interface engine 120. An example of a user interface that may be used to depict error logs stored on the error queue 124 is depicted in FIG. 4.

Accordingly, there is a technical need for correcting the error logs stored on the error queue 124 of the database system 102 in order to manage the storage capacity and/or the operational load associated with the database system 102 and/or with the test management system 106. In some cases, correcting error logs stored on the error queue 124 may be performed based on a correction request received by the user interface engine 120 from a triage system 128. The user interface engine 120 may then display a user interface on the triage system 128 that depicts indications of the test correction templates 122 and enables the triage system 128 (e.g., a user of the triage system 128 and/or an automated routine executing on the triage system 128) to select, based on user input, a test correction template along with the values corresponding to the parameters of the test correction template.

A test correction template may be a data object that enables entry of: (i) a first set of data values identifying a first set of error logs, and (ii) a second set of data values corresponding to a first set of erroneous data fields associated with the first set of error logs. For example, the test correction template may include a set of corrected data values for the erroneous data fields. In an example embodiment, a test correction template includes the corrected opportunity identifier value for an error log that identifies an erroneous opportunity identifier value. In some cases, the triage system 128 (e.g., a user of the triage system 128 and/or an automated routine executing on the triage system 128) may be configured to first select a test correction template and then provide a set of corrected data values as parameters of the selected template. After the triage system 128 provides an indication of the selection of a test correction template and a set of parameter values associated with the selected template, the user interface engine 120 may provide the selected template indication and the parameter values to the test correction engine 116 for execution of a test correction script corresponding to the selected template.

A test correction script may be a set of executable and parameterized set of database interaction instructions that are applied to the database system 102 to correct one or more error logs stored in the error queue 124 of the database system. The test correction script may be configured to perform the following operations: (i) identify a set of error logs, (ii) correct the identified error logs by re-executing the corresponding test script executions but with corrected data values, and/or (iii) after successfully re-executing the test script executions associated with the identified error logs, remove the identified error logs. Accordingly, the test correction script may be designed by a test administrator and be configured to correct a test failure caused by one or more erroneous data values associated with a previous test. For example, consider an example situation in which the execution of a test script fails because of an erroneous opportunity identifier value provided by the test script to the database system 102. In this example, a test correction script may be configured to re-execute the failed test script using a correct opportunity identifier value and subsequently remove the corresponding error log from the error queue 124 in response to successful re-execution of the test script.

In some cases, at least a subset of the operations associated with a test correction script may be executed using a database transaction to preserve the atomicity of those operations. In some cases, a test correction script re-executes test scripts associated with a batch of error logs. In some cases, given such a batch correction scenario, the set of operations associated with the various error logs in the batch may be executed either as one single transaction or as multiple transactions (e.g., as N transactions given N error logs affected by the corresponding test script). For example, in some cases, given a batch correction scenario, executing the operations as one single transaction may provide better performance in some cases since it avoids the overhead associated with committing multiple transactions. However, if the operations for one error log fail, rolling back the transaction would undo the operations for other error logs that may have succeeded. On the other hand, using multiple transactions may be less efficient but enable more fine-grained control and fault isolation, because if the operations for one error log fail, only that transaction is rolled back without affecting other error logs.

In some cases, after the triage system 128 provides a request to correct the error logs stored in the error queue 124, the user interface engine 120 queries a storage medium to retrieve to the test correction templates 122 and provides an indication of the test correction templates to the triage system 128. The triage system 128 may then select one of the test correction templates based on user input and provide one or more data values corresponding to the parameters of the selected template. After receiving the selected template and the parameter values, the user interface engine 120 may provide an indication of the selected template and the parameter values to the test correction engine 116, which then may execute operations associated with a test correction script based on the data received from the user interface engine 120. The test correction script may be configured to: (i) detect a set of error logs identified by the provided parameter values, (ii) re-execute the test script executions corresponding to the detected logs based on corrected data values identified by the provided parameter values, and (iii) subsequent to successful re-executions, remove the set of error logs from the error queue.

In some cases, the triage system 128 may identify an error log based on a job identifier associated with the error log. A job identifier may be a unique identifier assigned to a particular execution of a test script triggered by a job scheduler. Additionally or alternatively, the triage system 128 may use other metadata fields to identify an error logs. Examples of such metadata fields include test script names, test script identifiers, identifiers of database entities and/or records accessed by test script executions, and/or descriptive error messages. The triage system 128 may identify which fields of an error log are being corrected and/or the corrected data values for such fields. For example, the triage system 128 may select a test correction template that is configured to correct a particular data field (e.g., an opportunity identifier field) and then provide, as a parameter of the selected template, a corrected data value (e.g., a corrected opportunity value) corresponding to the particular data field.

In some cases, the set of test correction templates 122 stored on the test management system 106 are defined by one or more administrator user profiles of the test management system 106. For example, an administrator user may leverage their expertise with the system's testing frameworks, methodologies, and/or prior usage to pre-define common correction procedures that can cover a breadth of anticipated and/or observed test failures. In some cases, an administrator user can additionally or alternatively define test correction scripts and/or mappings of test correction templates 122 to test correction scripts. For example, the administrator user may manually code custom test correction scripts that carry out complex, multi-step corrective processes when applied against the database system 102. These scripts may update test data, reconfigure environments, retry operations, and/or the like based on various anticipated and/or observed failure scenarios.

Accordingly, as described above, the environment 100 enables three modes of supervised access to the database system 102: (i) a first supervised access mode according to which an agent system 110 may communicate with the database system 102 by using a set of front-end commands provided by the front-end system 108 as an intermediary system, (ii) a second supervised access mode according to which a tester system 112 may execute a test script within a test environment 104 as an intermediary environment, and (iii) a third supervised access mode according to which a triage system 128 can re-execute a previously-aborted test script based on a set of previously-defined test correction templates 122. The third supervised access mode enables the test management system 106 to provide supervised access to the database system 102 without requiring an intermediary solution and by using a set of previously defined templates that enable an authorized set of modifications to the database system 102. This template-based approach provides many technical advantages, as further described below.

For example, using the test correction templates 122 to correct aborted test script executions recorded on the error queue 124 of the database system 102 makes the test correction capabilities of the test management system 106 more scalable and/or adaptable. As new types of test execution errors are observed and/or documented, an administrator user can update the set of test correction templates 122 to add new templates associated with new test correction scripts. Moreover, as properties associated with existing test execution errors change, the administrator user can modify the parameters and/or the operations (e.g., the test correction script) associated with the corresponding test correction templates. Accordingly, using the techniques described herein may make the test correction capabilities of the test management system 106 more scalable and/or adaptable.

As another example, using the test correction templates 122 to correct aborted test script executions recorded on the error queue 124 of the database system 102 makes the test correction capabilities of the test management system 106 more efficient in terms of usage of storage resources. In some cases, if a test execution error is no longer relevant because of a change in the configuration data associated with the front-end system 108 and/or because of a change in the schema associated with the database system 102, an administrator user can remove the test correction template and/or the test correction script associated with correcting the particular error type. This removes and/or reduces the need for storing test correction templates 122 on the test management system 106, thus reducing the storage requirements associated with the test management system 106 over time.

Figure 2:
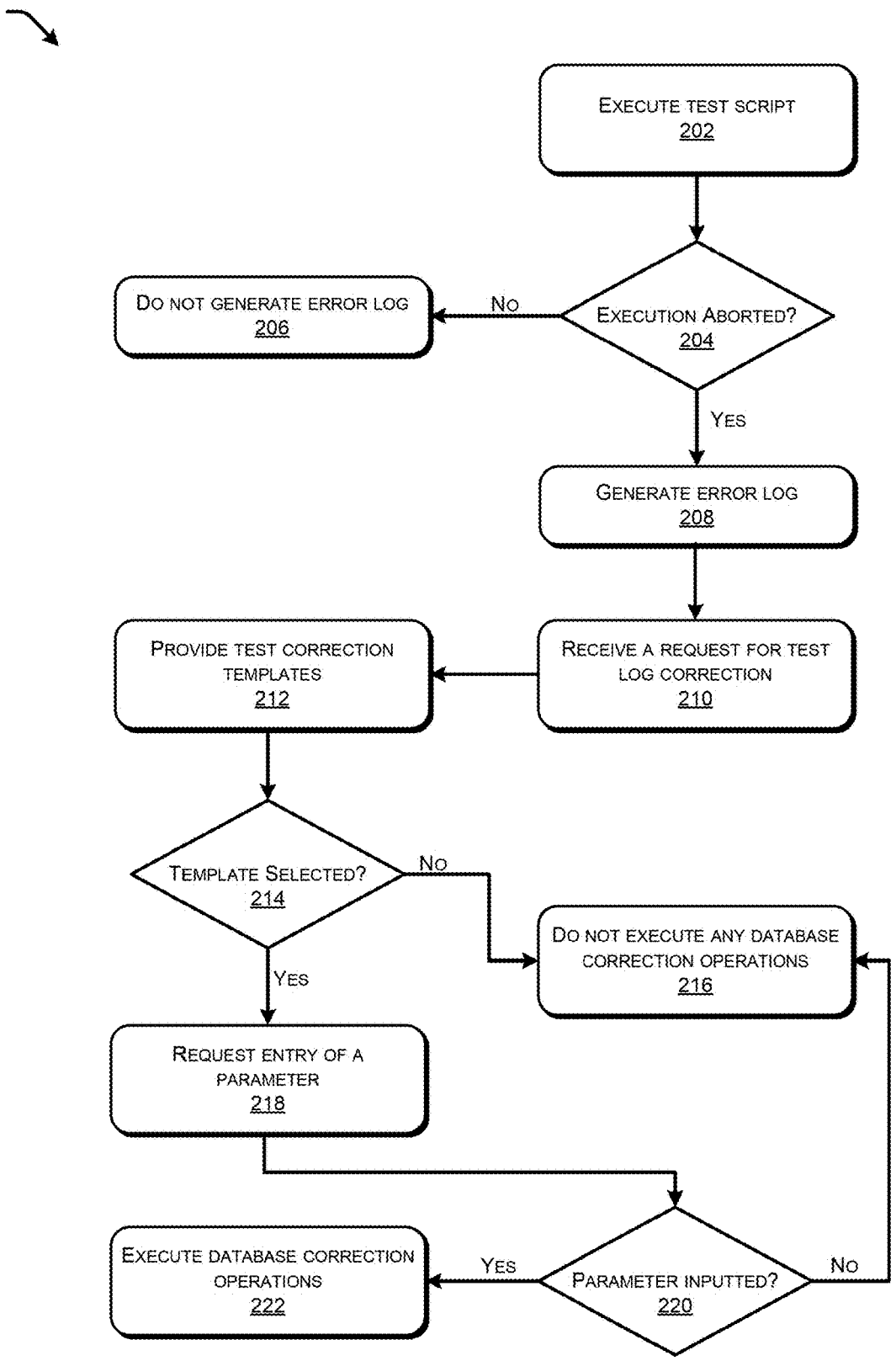
FIG. 2 is a flowchart diagram of an example process for executing a test script with an error recovery mechanism.

FIG. 2 is a flowchart diagram of an example process 200 for executing a test script with an error recovery mechanism. As depicted in FIG. 2, at operation 202, the test engine 118 executes a test script. The test script may be an executable and parameterized set of database interaction instructions that are applied to the database system 102 within constraints set by both the script logic and overarching access controls on the database system 102. In some cases, to execute the test script, the test engine 118 generates a test environment 104 and executes the test script within the test environment 104. The test environment 104 may include a simulated and/or virtual instance of the database system 102, designed to simulate and/or replicate the functionality and data structures of the database system 102 without impacting the database system 102. The test environment 104 may be isolated from the database system 102 to ensure that test executions do not interfere with the data stored on the database system 102. The test environment 104 may include a subset of the data stored by the database system 102 that is anonymized and/or data that is synthetically generated in accordance with one or more database schemas associated with the database system 102.

At operation 204, the test engine 118 determines whether the execution of the test script is aborted because of an incorrect data value provided as a parameter of the test script execution. For example, the execution of the test script may be aborted because no data record stored on the database system 102 is associated with a data value (e.g., an opportunity identifier value) provided as a parameter of the test correction script. In some cases, the data value provided as the parameter of the test correction script may be associated with the primary key of at least one table stored on the database system 102. In some cases, if no data record of the relevant table(s) has a primary key value that corresponds to the test script parameter value, the test engine 118 aborts the execution of the test script.

If the test engine 118 determines that the execution of the test script is not aborted because of an incorrect data value provided as a parameter of the test script execution (operation 204-No), the test engine 118 proceeds to operation 206 to refrain from generating an error log on the error queue 124. If the test engine 118 determines that the execution of the test script is aborted because of an incorrect data value provided as a parameter of the test script execution (operation 204—Yes), the test engine 118 proceeds to operation 208 to generate an error log on the error queue 124. After operation 208, operation 210 is performed.

At operation 210, the user interface engine 120 receives a request for correcting the aborted test script execution associated with the error log. The user interface engine 120 may receive such a request from the triage system 128 (e.g., based on an action performed by a user of the triage system 128 and/or an automated routine executing on the triage system 128). In some cases, the request may be provided using an API command provided to the user interface engine 120 and/or a user interface action performed in relation to a user interface (e.g., a triage user interface) displayed by the user interface engine 120.

At operation 212, the user interface engine 120 provides a set of test correction templates 122 to the triage system 128. The user interface engine 120 may retrieve the set of test correction templates 122 and provide the retrieved set to the triage system 128. The user interface engine 120 may, for example, provide the retrieved set using an API response and/or using display data associated with a user interface (e.g., a triage user interface) displayed by the user interface engine 120.

At operation 214, the user interface engine 120 determines whether the triage system 128 has selected one of the templates from set of test correction templates 122 provided to the triage system 128. The template selection may be performed using an API call and/or a user interface action performed in relation to a user interface (e.g., a triage user interface) displayed by the user interface engine 120. If the user interface engine 120 determines that the triage system has not selected a test correction template (operation 214–No), the user interface engine 120 proceeds to operation 216 to refrain from executing any test correction scripts.

If the user interface engine 120 determines that the triage system 128 has selected a test correction template (operation 214—Yes), the user interface engine 120 proceeds to operation 218 to request that the triage system 128 provides a parameter value associated with the selected test correction template. The request to the triage system 128 may be using at least one of an API response or a prompt in a user interface (e.g., a triage user interface) displayed by the user interface engine 120. After operation 218, operation 220 is performed.

At operation 220, the user interface engine 120 determines whether the triage system 128 has entered the parameter value for the selected template. The entry of the template parameter value may be performed using an API call and/or a user interface action performed in relation to a user interface (e.g., a triage user interface) displayed by the user interface engine 120. If the user interface engine 120 determines that the triage system 128 has not entered the parameter value for the selected template (operation 220—No), the user interface engine 120 proceeds to operation 216 to refrain from executing any test correction scripts.

If the user interface engine 120 determines that the triage system 128 has entered the parameter value for the selected template (operation 220—Yes), the test correction engine 116 proceeds to operation 222 to execute a test correction script based on the operations associated with the selected template and the template parameter value(s) provided by the triage system 128. A test correction script may be a set of executable and parameterized set of database interaction instructions that are applied to the database system 102 to correct one or more error logs stored in the error queue 124 of the database system. The test correction script may be configured to perform the following operations: (i) identify a set of error logs, (ii) correct the identified error logs by re-executing the corresponding test script executions but with corrected data values, and/or (iii) after successfully re-executing the test script executions associated with the identified error logs, remove the identified error logs. In some cases, during the re-execution of a test script, the database system 102 may disable retrieval of any data records modified and/or retrieved by the test script. In some cases, execution of a test correction script is based on (e.g., in response to) an approval of the test correction script from an administrator profile associated with the test management system 106.

Accordingly, the process 200 enables the test management system 106 to generate an error log stored on the database system 102 corresponding to an aborted test script execution and enable correcting the aborted test script execution based on a parameter value associated with a selected test correction template. Via the process 200, the test management system 106 enables using the test correction templates 122 to enable supervised access to the database system 102 for correcting previously aborted test script executions.

Figure 3:
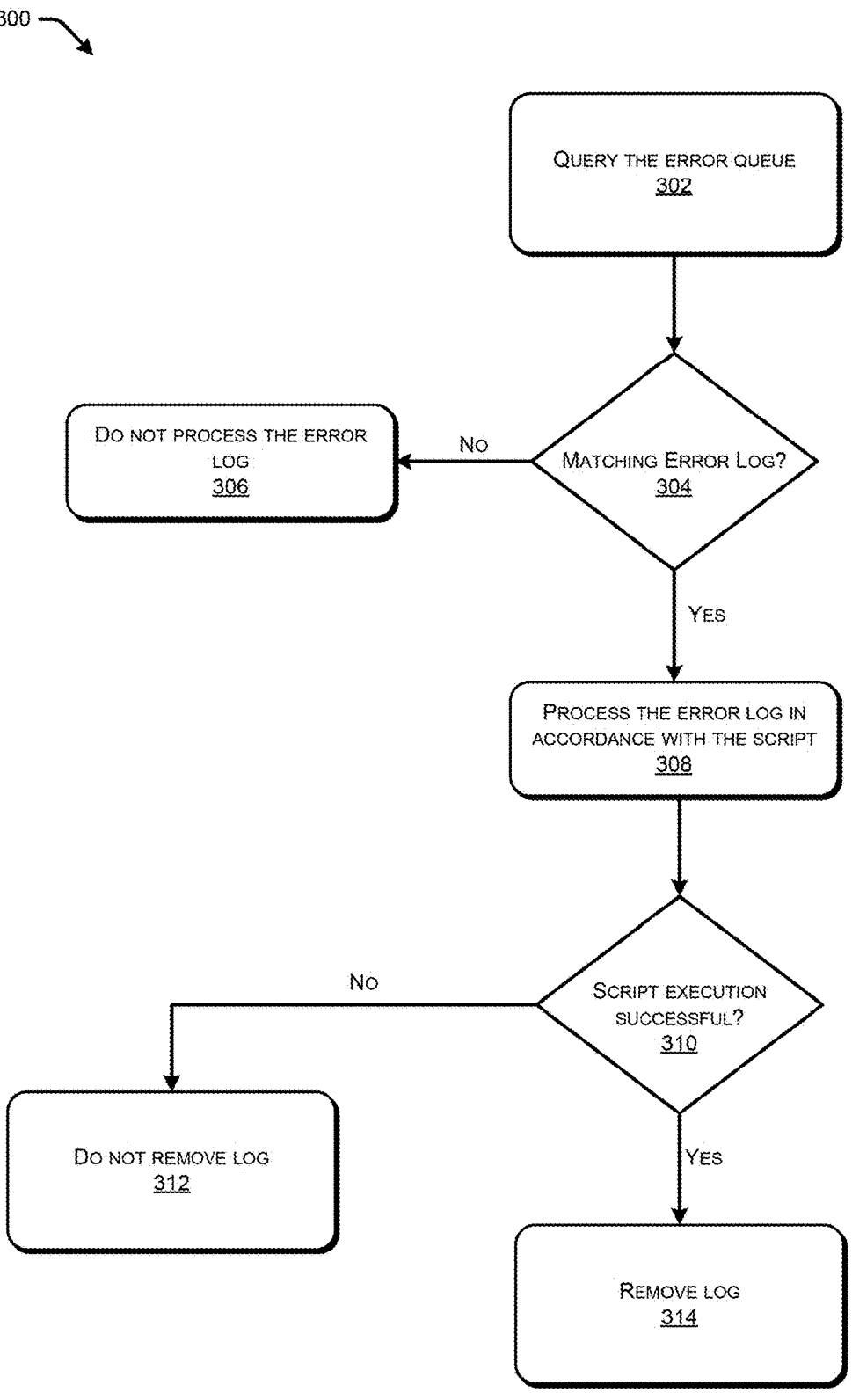
FIG. 3 is a flowchart diagram of an example process for executing a test correction script using a supervised data access mode.

FIG. 3 is a flowchart diagram of an example process 300 for executing a test correction script using a supervised data access mode. As depicted in FIG. 3, at operation 302, the test correction engine 116 queries the error queue 124 stored on the database system 102 based on an error log identifier value. The error log identifier value may be provided as part of the parameters for a selected test correction template. An example of an error log identifier associated with an error log may be a job identifier for a test script execution corresponding to the error log.

At operation 304, the test correction engine 116 determines whether querying the error queue 124 based on the error log identifier value returns a matching error log stored on the error queue 124. If the querying the error queue 124 based on the error log identifier value does not return a matching error log (operation 304—No), the test correction engine 116 proceeds to operation 306 to refrain from processing the matching error log.

If the querying the error queue 124 based on the error log identifier value returns a matching error log (operation

304—Yes), the test correction engine 116 proceeds to operation 308 to perform operations associated with the test correction script. The operations associated with the test correction script may include re-executing the test correction script based on a data value (e.g., an opportunity identifier value) provided by the parameters of the test correction script. After operation 308, the test correction engine 116 proceeds to operation 310.

At operation 310, the test correction engine 116 determines whether the re-execution of the test script is successful (e.g., does not generate an error). If the test correction engine 116 determines that the re-execution of the test script is unsuccessful (operation 310—No), the test correction engine 116 proceeds to operation 312 to refrain from removing the error log from the error queue 124. If the test correction engine 116 determines that the re-execution of the test script is successful (operation 310—Yes), the test correction engine 116 proceeds to operation 314 to remove the error log from the error queue 124.

Accordingly, the process 300 enables the test management system 106 to execute a test correction script, where the test correction script may: (i) identify a set of error logs, (ii) correct the identified error logs by re-executing the corresponding test script executions but with corrected data values (e.g., the correction may be performed based on operations encoded into the test script), and/or (iii) after successfully re-executing the test script executions associated with the identified error logs, remove the identified error logs. Via the process 300, the test management system 106 enables executing operations associated with a test correction template to enable supervised access to the database system 102 for correcting previously aborted test script executions.

FIG. 4 provides an operational example of a user interface 400 that displays a set of error logs associated with a set of previously aborted test script executions. As depicted in FIG. 4, the user interface 400 displays, for each error log in a set of error logs, a job identifier depicted by the column 402. The job identifier field may be an example of an error log identifier field. The job identifier field may, for example, be an identifier for an execution job associated with the previously aborted test script execution job.

As further depicted in FIG. 4, the user interface 400 displays, for each error log in a set of error logs, an error message depicted by the column 404. The error message may be a textual description of the corresponding error log that is generated based on at least one of: (i) a human-provided error message (e.g., provided by the end user of the triage system 128), or (ii) an automatically generated error message (e.g., generated by an automated test correction routine performed by the triage system 128, generated based on a predefined textual description and/or textual description template associated with the corresponding error type, and/or the like).

As further depicted in FIG. 4, the user interface 400 displays, for each error log in a set of error logs, a timestamp depicted by the column 406. The timestamp may represent a time associated with occurrence of the test script execution failure associated with the error log and/or with generation of the error log in the error queue 124.

Accordingly, the user interface 400 may be displayed by the user interface engine 120 as an initial step in a process for remediation of a test script execution failure. Using the user interface 400, the triage system 128 may cause execution of a test correction script that is configured to access the database system 102 using a supervised database access mode to re-execute a previously aborted test script execution and remove the corresponding error log from the error queue 124 of the database system 102.

FIG. 5 provides an operational example of a user interface 500 that displays creating and/or modifying configuration data associated with a test correction template. As depicted in FIG. 5, the user interface 500 enables user entry of a code associated with the test correction template using the field 502. The code may be used as a primary key value for referencing the test correction template. The code may be provided by a user of the triage system 128.

As further depicted in FIG. 5, the user interface 500 enables user entry of a name associated with the test correction template using the field 504. The name may be a user-provided textual identifier associated with the test correction template. The name may be provided by a user of the triage system 128.

As further depicted in FIG. 5, the user interface 500 enables user entry of a type associated with the test correction template using the field 506. The type may be a categorical value that designates that the template relates to test correction. The type's selection may be provided by a user of the triage system 128.

As further depicted in FIG. 5, the user interface 500 enables user entry of a description associated with the test correction template using the field 508. The description may be a user-provided textual description associated with the test correction template. The name may be provided by a user of the triage system 128.

As further depicted in FIG. 5, the user interface 500 enables user entry of a script associated with the test correction template using the field 510. The script may define a set of operations associated with the test correction template. The name may be provided by a user of the triage system 128.

As further depicted in FIG. 5, the example script depicted in FIG. 5 includes a script segment 512 that imports the Query and Relop classes in a the api.database library. The api.database library may be configured to provide functionalities for creating and executing database queries. The script segment 514 also imports the Transaction class in the api.transaction library. The api.transaction may provide functionalities for handling database transactions.

As further depicted in FIG. 5, the example script depicted in FIG. 5 includes a script segment 514 that creates a query to find a specific sales opportunity related to a job identifier. Specifically, the salesopp_query=Query.make('Opportunity_Entity) line creates a new Query object for the Opportunity_Entity table. Moreover, the salesopp_query.compare ('Opportunity_Entity #Job_Number', Relop.EQUALS, 'current_job_number') line adds a comparison to the query to specify that the Job_Number field in the Opportunity_Entity table should be equal to the value of current_job_number.

As further depicted in FIG. 5, the example script depicted in FIG. 5 includes a script segment 516 that executes the created query and saves the query result. Specifically, the salesopp=salesopp_query.select( ).first( ) line executes the query and stores the received query result in the salesopp variable.

As further depicted in FIG. 5, the example script depicted in FIG. 5 includes a script segment 518 that starts a new database transaction. Specifically, the with Transaction.new_bundle( ) starts a new transaction block by creating a transaction bundle.

As further depicted in FIG. 5, the example script depicted in FIG. 5 includes a script segment 520 that adds a new business opportunity to the created transaction bundle. Specifically, the bundle.add(salesopp) line adds the salesopp variable to the created transaction bundle.

As further depicted in FIG. 5, the example script depicted in FIG. 5 includes a script segment 522 that updates the Opportunity_Identifier value for the salesopp variable to the value XXXXXXXXXXXXX. The value may be a parameter of the test correction template being created and/or updated.

As further depicted in FIG. 5, the example script depicted in FIG. 5 includes a script segment 524 that updates finalize the transaction. Specifically, the bundle.commit ('policycorr_daemon') line commits the transaction in the transaction bundle to apply all the changes made within the transaction block.

Accordingly, as depicted in FIG. 5, the user interface 500 enables defining a test correction template that is associated with a test correction script. The test correction script may: (i) identify a set of error logs via job identifiers, (ii) correct the identified error logs by re-executing the corresponding test script executions but with corrected opportunity identifier values, and/or (iii) after successfully re-executing the test script executions associated with the identified error logs, remove the identified error logs. Using the user interface 500, the triage system 128 may cause execution of a test correction script that is configured to access the database system 102 using a supervised database access mode to re-execute a previously aborted test script execution and remove the corresponding error log from the error queue 124 of the database system 102.

Figure 6:
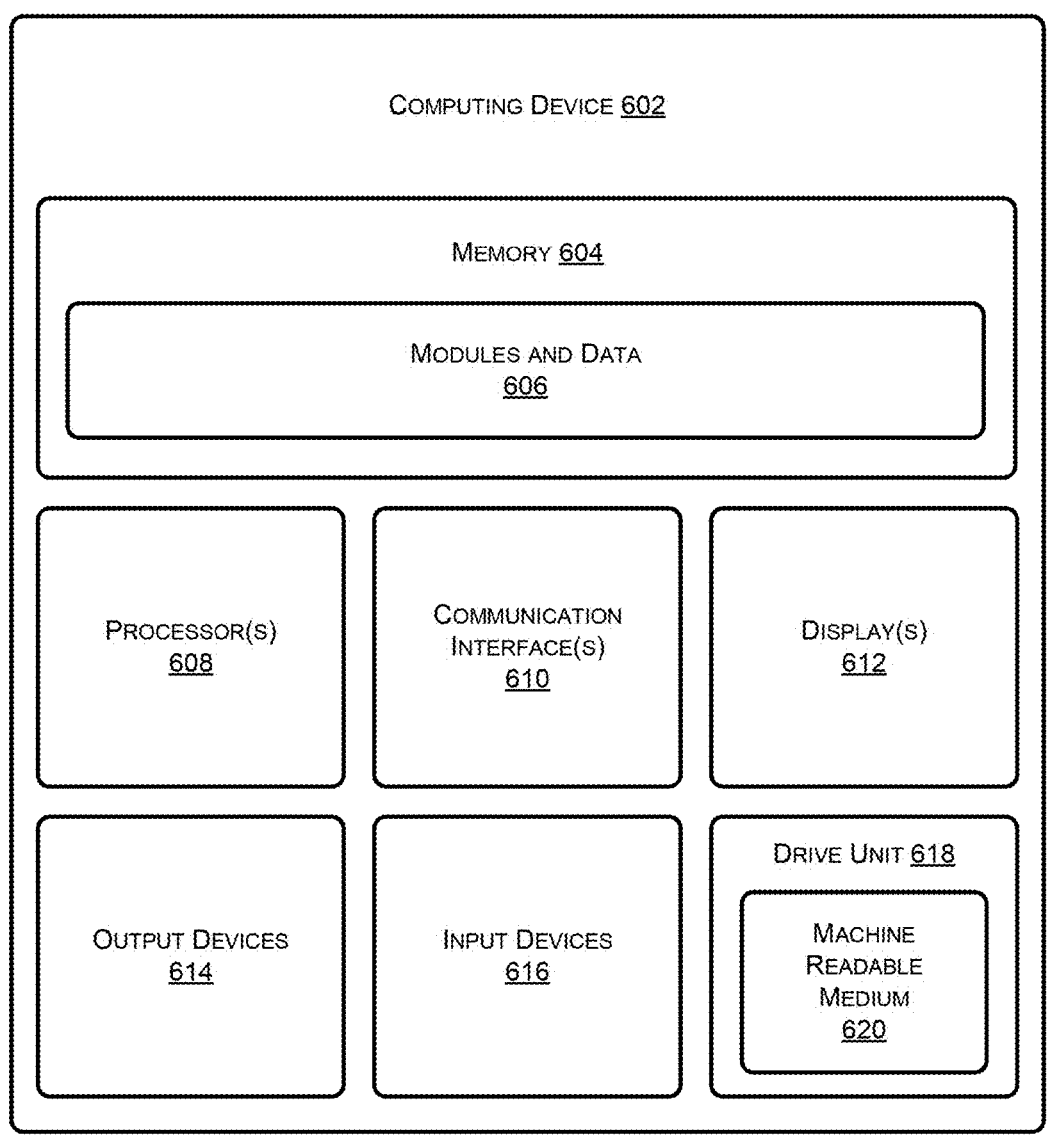
FIG. 6 shows an example system architecture for a computing device associated with an environment described herein.

FIG. 6 shows an example system architecture for a computing device 602 associated with the environment 100 described herein. A computing device 602 can be a server, computer, or other type of computing device that executes at least a portion of the environment 100. In some examples, elements of the environment 100 can be distributed among, and/or be executed by, multiple computing devices 602.

A computing device 602 can include memory 604. In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 602 associated with the environment 100. Any such non-transitory computer-readable media may be part of the computing devices 602. The memory 604 can include modules and data 606 needed to perform operations of one or more computing devices 602 of the environment 100.

One or more computing devices 602 of the environment 100 can also have processor(s) 608, communication interfaces 610, displays 612, output devices 614, input devices 616, and/or a drive unit 618 including a machine readable medium 620.

In various examples, the processor(s) 608 can be a central processing unit (CPU), a graphics processing unit (GPU), both a CPU and a GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing computer applications stored in the memory 604, which can be associated with common types of volatile (RAM) and/or nonvolatile (ROM) memory.

The communication interfaces 610 can include transceivers, modems, interfaces, antennas, telephone connections, and/or other components that can transmit and/or receive data over networks, telephone lines, or other connections.

The display 612 can be a liquid crystal display or any other type of display commonly used in computing devices. For example, a display 612 may be a touch-sensitive display screen and can then also act as an input device or keypad, such as for providing a soft-key keyboard, navigation buttons, or any other type of input.

The output devices 614 can include any sort of output devices known in the art, such as a display 612, speakers, a vibrating mechanism, and/or a tactile feedback mechanism. Output devices 614 can also include ports for one or more peripheral devices, such as headphones, peripheral speakers, and/or a peripheral display.

The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 620 can store one or more sets of instructions (e.g., a set of computer-executable instructions), such as software or firmware, that embodies any one or more of the methodologies or functions described herein. The instructions can also reside, completely or at least partially, within the memory 604, processor(s) 608, and/or communication interface(s) 610 during execution thereof by the one or more computing devices 602 of the environment 100. The memory 604 and the processor(s) 608 also can constitute machine readable media 620. The instructions may cause the processor(s) 608 to perform operations described in this document.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:
1. A method comprising:
receiving, by a processor, a first request to execute a test script, wherein the first request comprises a first data value corresponding to a first data field;
based on receiving the first request, executing, by the processor, the test script, wherein executing the test script comprises providing a second request to a database system to perform data retrieval based on the first data value;

receiving, by the processor and based on the second request, a first indication of a first error log stored on the database system, wherein the first error log represents that execution of test script was aborted based on a failure to match the first data field with data stored on the database system;
receiving, by the processor and based on the first indication, a first test correction template configured to request execution of a first test correction script;
receiving, by the processor and based on the first indication, a second test correction template configured to request execution of a second test correction script, wherein:
the first test correction template requires user entry of at least a second data value corresponding to the first data field, and
the second test correction template requires user entry of at least a third data value corresponding to a second data field;
providing, by the processor, the first test correction template and the second test correction template via a display;
receiving, by the processor and via the display, input data comprising a second indication of a selection of the first test correction template and a third indication of entry of the second data value; and
based on receiving the input data, executing, by the processor, the first test correction script.
2. The method of claim 1, wherein executing the first test correction script comprises:
determining a fourth indication of the first error log based on the input data, and
providing a third request to the database system to modify the first error log to replace the first data value with the second data value, wherein the database system is configured to, based on receiving the third request, re-execute the test script based on the second data value.
3. The method of claim 2, wherein:
executing the test script comprises executing the test script in a test environment,
the test environment is configured to communicate with the database system via an access interface, and
executing the first test correction script comprises communicating with the database system directly.
4. The method of claim 2, wherein the database system is configured to, subsequent to re-executing the test script, remove the first error log.
5. The method of claim 2, wherein:
the input data further comprises a fourth data value corresponding to the first data field,
the third request is a database transaction request that requests atomic execution of a plurality of database modification operations, and
the plurality of database modification operations comprise a first operation to modify the first error log to replace the first data value with the second data value and a second operation to modify a second error log to replace a fifth data value represented by the second error log in relation to the first data field with a sixth data value.
6. The method of claim 2, wherein:
the first data field corresponds to a global identifier field that is used by a front-end system to query the database system, the front-end system enables a first system that is authorized to access the front-end system to access the database system via the front-end system, and executing the test script comprises executing the test script using a test environment that enables a second system that is not authorized to access the front-end system to:

access the database system to retrieve a first data record, and determine a first behavior of the front-end system to a modification in a functionality provided by the front-end system, wherein the functionality comprises querying the database system based on the first data value and generating first display data based on a query output.

7. The method of claim 2, wherein determining the fourth indication comprises:

querying a first storage component of the database system to receive a fourth data value corresponding to a log identifier field, wherein querying the first storage component is performed based on the second data value; and querying a second storage component of the database system to receive a query result comprising the fourth indication, wherein querying the second storage component is performed based on the fourth data value.

8. The method of claim 7, wherein executing the first test correction script further comprises:

storing the fourth indication in a transaction set, wherein the transaction set comprises the fourth indication and a fifth indication corresponding to a second error log;

generating a database transaction request, wherein the database transaction request represents the third data value in relation to the fourth indication and a fifth data value corresponding to the first data field in relation to the fifth indication; and generating the third request based on the database transaction request.

9. The method of claim 8, wherein the third request is a request to execute a database transaction corresponding to the database transaction request using a daemon process.

10. The method of claim 9, wherein the database system is configured to disable retrieval of a first data record corresponding to the second data value during re-execution of the test script.

11. A computing system, comprising a processor and memory storing computer-executable instructions that, when executed by the processor, cause the computing system to perform operations comprising:

receiving a first request to execute a test script, wherein the first request comprises a first data value corresponding to a first data field;

based on receiving the first request, executing the test script, wherein executing the test script comprises providing a second request to a database system to perform data retrieval based on the first data value;

receiving, based on the second request, a first indication of a first error log stored on the database system, wherein the first error log represents that execution of test script was aborted based on a failure to match the first data field with data stored on the database system;

receiving, based on the first indication, a first test correction template configured to request execution of a first test correction script;

receiving, based on the first indication, a second test correction template configured to request execution of a second test correction script, wherein:

the first test correction template requires user entry of at least a second data value corresponding to the first data field, and the second test correction template requires user entry of at least a third data value corresponding to a second data field;

providing the first test correction template and the second test correction template via a display;

receiving, via the display, input data comprising a second indication of a selection of the first test correction template and a third indication of entry of the second data value; and based on receiving the input data, executing the first test correction script.

12. The computing system of claim 11, wherein executing the first test correction script comprises:

determining a fourth indication of the first error log based on the input data, and providing a third request to the database system to modify the first error log to replace the first data value with the second data value, wherein the database system is configured to, based on receiving the third request, re-execute the test script based on the second data value.

13. The computing system of claim 12, wherein:

executing the test script comprises executing the test script in a test environment, the test environment is configured to communicate with the database system via an access interface, and executing the first test correction script comprises communicating with the database system directly.

14. The computing system of claim 12, wherein the database system is configured to, subsequent to re-executing the test script, remove the first error log.

15. The computing system of claim 12, wherein:

the input data further comprises a fourth data value corresponding to the first data field, the third request is a database transaction request that requests atomic execution of a plurality of database modification operations, and the plurality of database modification operations comprise a first operation to modify the first error log to replace the first data value with the second data value and a second operation to modify a second error log to replace a fifth data value represented by the second error log in relation to the first data field with a sixth data value.

16. The computing system of claim 12, wherein:

the first data field corresponds to a global identifier field that is used by a front-end system to query the database system, the front-end system enables a first system that is authorized to access the front-end system to access the database system via the front-end system, and executing the test script comprises executing the test script using a test environment that enables a second system that is not authorized to access the front-end system to:

access the database system to retrieve a first data record, and determine a first behavior of the front-end system to a modification in a functionality provided by the front-end system, wherein the functionality comprises querying the database system based on the first data value and generating first display data based on a query output.

17. One or more non-transitory computer-readable media storing computer-executable instructions that, when executed by a processor, cause the processor to perform operations, comprising:

receiving a first request to execute a test script, wherein the first request comprises a first data value corresponding to a first data field;

based on receiving the first request, executing the test script, wherein executing the test script comprises providing a second request to a database system to perform data retrieval based on the first data value;

receiving, based on the second request, a first indication of a first error log stored on the database system, wherein the first error log represents that execution of test script was aborted based on a failure to match the first data field with data stored on the database system;

receiving, based on the first indication, a first test correction template configured to request execution of a first test correction script;

receiving, based on the first indication, a second test correction template configured to request execution of a second test correction script, wherein:

the first test correction template requires user entry of at least a second data value corresponding to the first data field, and the second test correction template requires user entry of at least a third data value corresponding to a second data field;

providing the first test correction template and the second test correction template via a display;

receiving, via the display, input data comprising a second indication of a selection of the first test correction template and a third indication of entry of the second data value; and based on receiving the input data, executing the first test correction script.

18. The one or more non-transitory computer-readable media of claim 17, wherein executing the first test correction script comprises:

determining a fourth indication of the first error log based on the input data, and providing a third request to the database system to modify the first error log to replace the first data value with the second data value, wherein the database system is configured to, based on receiving the third request, re-execute the test script based on the second data value.

19. The one or more non-transitory computer-readable media of claim 18, wherein:

executing the test script comprises executing the test script in a test environment, the test environment is configured to communicate with the database system via an access interface, and executing the first test correction script comprises communicating with the database system directly.

20. The one or more non-transitory computer-readable media of claim 18, wherein:

the input data further comprises a fourth data value corresponding to the first data field, the third request is a database transaction request that requests atomic execution of a plurality of database modification operations, and the plurality of database modification operations comprise a first operation to modify the first error log to replace the first data value with the second data value and a second operation to modify a second error log to replace a fifth data value represented by the second error log in relation to the first data field with a sixth data value.

* * * * *